United States Patent
Panamarathupalayam et al.

(10) Patent No.: US 12,391,862 B2
(45) Date of Patent: Aug. 19, 2025

(54) FLUID LOSS CONTROL AGENT FOR AQUEOUS WELLBORE FLUIDS

(71) Applicant: Schlumberger Technology Corporation, Sugar Land, TX (US)

(72) Inventors: Balakrishnan Panamarathupalayam, Houston, TX (US); Linus Sebelin, Houston, TX (US)

(73) Assignee: Schlumberger Technology Corporation

( * ) Notice: Subject to any disclaimer, the term of this patent is extended or adjusted under 35 U.S.C. 154(b) by 0 days.

(21) Appl. No.: 17/756,196

(22) PCT Filed: Dec. 3, 2020

(86) PCT No.: PCT/US2020/063036
§ 371 (c)(1),
(2) Date: May 19, 2022

(87) PCT Pub. No.: WO2021/113460
PCT Pub. Date: Jun. 10, 2021

(65) Prior Publication Data
US 2023/0002665 A1     Jan. 5, 2023

Related U.S. Application Data

(60) Provisional application No. 62/943,140, filed on Dec. 3, 2019.

(51) Int. Cl.
| | | |
|---|---|---|
| *C09K 8/487* | (2006.01) | |
| *C09K 8/575* | (2006.01) | |
| *C09K 8/588* | (2006.01) | |
| *C09K 8/88* | (2006.01) | |

(52) U.S. Cl.
CPC ............ *C09K 8/487* (2013.01); *C09K 8/5751* (2013.01); *C09K 8/588* (2013.01); *C09K 8/88* (2013.01)

(58) Field of Classification Search
CPC ... C09K 8/42; C09K 8/44; C09K 8/46; C09K 8/467; C09K 8/487; C09K 8/56; C09K 8/57; C09K 8/575; C09K 8/5751; C09K 8/58; C09K 8/588; C09K 8/84; C09K 8/86; C09K 8/88; C09K 2208/00; C09K 2208/18
See application file for complete search history.

(56) References Cited

U.S. PATENT DOCUMENTS

| | | | |
|---|---|---|---|
| 3,547,899 A | 12/1970 | Arlt | |
| 2002/0161087 A1* | 10/2002 | Heitz | C08F 293/005 524/379 |
| 2004/0129459 A1* | 7/2004 | Guichard | C09K 8/502 175/65 |
| 2006/0187875 A1 | 8/2006 | Bang | |
| 2010/0173804 A1 | 7/2010 | Van de Peer et al. | |
| 2011/0281778 A1* | 11/2011 | Federici | C09K 8/5083 507/119 |
| 2013/0319667 A1* | 12/2013 | Chen | C09K 8/035 507/224 |
| 2016/0130497 A1* | 5/2016 | Liu | C09K 8/03 507/225 |
| 2016/0304769 A1* | 10/2016 | Jones | C09K 8/68 |
| 2017/0121590 A1* | 5/2017 | Lopez | C09K 8/035 |
| 2018/0312621 A1* | 11/2018 | Wilson | C09K 8/588 |
| 2019/0185740 A1 | 6/2019 | Jung et al. | |

FOREIGN PATENT DOCUMENTS

| | | | | |
|---|---|---|---|---|
| CA | 2791853 A1 * | 8/2011 | ............ | A61K 8/042 |
| WO | 2006077371 A2 | 7/2006 | | |
| WO | WO-2017132659 A1 * | 8/2017 | ............... | C09K 8/36 |

OTHER PUBLICATIONS

International Preliminary Report on Patentability issued in International Patent application PCT/2020/063036 on Jun. 16, 2022, 7 pages.

International Search Report and Written Opinion issued in International Patent application PCT/2020/063036 on Mar. 17, 2021, 9 pages.

* cited by examiner

*Primary Examiner* — Angela M Ditrani Leff

(74) *Attorney, Agent, or Firm* — Jeffrey D. Frantz

(57) ABSTRACT

Fluid loss control agents for use in a water-based wellbore fluid. The fluid loss control agents generally include non-crosslinked copolymers of non-carboxylated monomers. Water-based wellbore fluids containing the above fluid loss control agents and methods of servicing a wellbore in a subterranean formation by placing the water-based wellbore fluids in the wellbore.

16 Claims, No Drawings

FLUID LOSS CONTROL AGENT FOR AQUEOUS WELLBORE FLUIDS

CROSS-REFERENCE TO RELATED APPLICATION

This application claims the benefit of U.S. Provisional Application 62/943,140 entitled "Fluid Loss Control Agent for Aqueous Wellbore Fluids," filed Dec. 3, 2019, the disclosure of which is incorporated herein by reference in its entirety.

FIELD

The present disclosure generally relates to a latex comprising a non-crosslinked copolymer of non-carboxylated monomers for use as a fluid loss control agent in a water-based wellbore fluid. The present disclosure also relates to water-based wellbore fluids including the fluid loss control agent of the present disclosure and to methods of drilling, completion and working over of a wellbore utilizing the same.

BACKGROUND

Subterranean deposits of natural resources such as gas, water and crude oil, are commonly recovered by drilling wellbores to tap subterranean formations or zones containing such deposits. Various fluids are employed in drilling a wellbore and preparing the wellbore and an adjacent subterranean formation for the recovery of material therefrom. For example, a drilling fluid is a complex mixture of chemicals that is circulated through the wellbore to cool and lubricate the drill bit, suspend formation cuttings, lift them to the surface, and control formation pressure during the drilling of the wellbore. Such mixture of chemicals may include, for example, viscosifiers, dispersants, emulsifiers, weighting agents, fluid loss control agents, pH control agents, salts, lubricants, select polymers, corrosion inhibitors or biocides that enable the drilling fluid to meet the needs of the particular drilling operation.

Drilling fluids can be classified as either oil-based drilling fluids or water-based drilling fluids depending upon the character of the continuous phase of the fluid. Oil-based drilling fluids generally use hydrocarbon oil as the main liquid component with clays or colloidal asphalts to provide the desired viscosity along with other additives including emulsifiers, polymers and weighting agents. Water may also be present, but in an amount not usually greater than 50 volume percent of the entire composition. If more than about 5 volume percent of water is present, the fluid is often referred to as an invert emulsion, i.e., water-in-oil emulsion.

Water-based drilling fluids generally include viscosifiers, fluid loss control agents, weighting agents and other additives including lubricants, emulsifiers, corrosion inhibitors, salts and pH control agents. Water makes up the continuous phase of the fluid and is usually present in any amount of at least 50 volume percent of the entire composition. Oil may also be present in minor amounts but will typically not exceed the amount of the water so that the fluid will retain its character as a water continuous phase material.

Various types of water-based drilling fluids may be used in drilling operations including potassium-based fluids, salt water-based fluids, seawater-based fluids, silicate-based fluids and lime-based fluids. Potassium-based fluids are the most widely accepted water-based fluid for drilling water-sensitive shales since potassium ions can attach to and stabilize clay surfaces and can also help hold the cuttings together to minimize dispersion into finer particles. Salt water-based fluids contain varying amounts of dissolved sodium chloride as a major component whereas seawater-based fluids are designed for offshore drilling whose make-up water is taken from the ocean. Silicate-based fluids contain sodium or potassium silicate as the inhibitive component while lime-based fluids are saturated with lime and calcium hydroxide.

Unfortunately, fluid loss from these water-based drilling fluids often occurs in the wellbore resulting in severe downhole problems. For example, an excessive amount of filter cake can build up on the walls of the wellbore causing the drill pipe to become stuck thus making it difficult to remove from the wellbore. Also, fluid loss may lead to sloughing and caving in of shale formations. Further, electrical logging of the wellbore can be adversely affected due to fluid loss.

Various natural polymers (for e.g. cellulosic polymers, starches, modified starches, carboxymethylcellulose/polysaccharide) and synthetic polymers (for e.g. polyacrylamide and styrene/butadiene) are commonly added to control fluid loss from the water-based drilling fluids into the subterranean formations. However, some wellbores into which the water-based drilling fluids are pumped have relatively high downhole temperatures and/or pressures at which traditional fluid loss control agents are unstable. As such, traditional fluid loss control agents may fail to serve their purpose of providing fluid loss control downhole. Moreover, synthetic styrene/butadiene copolymers are known to cause formation damage.

As more and more challenging conditions are encountered in wellbore operations, there has arisen a need for improved fluid loss control agents which may be used in water-based drilling fluids to improve the drilling fluids tolerance to fluid loss at high temperatures and pressures with minimal or no effect on the drilling fluids rheological properties.

SUMMARY

The present disclosure provides a latex comprising a non-crosslinked copolymer of non-carboxylated monomers for use as a fluid loss control agent in a wellbore fluid.

According to another embodiment, the present disclosure provides a wellbore fluid including the fluid loss control agent of the present disclosure and a water-based fluid.

In another embodiment, the present disclosure provides a method for modifying the fluid loss properties of a water-based wellbore fluid including adding the fluid loss control agent of the present disclosure to the wellbore fluid.

In still another embodiment, the present disclosure provides a method for conducting an oilfield operation including placing the wellbore fluid including the fluid loss control agent of the present disclosure and a water-based fluid into a wellbore. The oilfield operation may be, for example, a drilling, completion stimulation, a sand control treatment, cementing, maintenance, enhanced oil recovery or reactivation operation.

DETAILED DESCRIPTION

The following terms shall have the following meanings:

The term "comprising" and derivatives thereof are not intended to exclude the presence of any additional component, step or procedure, whether or not the same is disclosed herein. In order to avoid any doubt, all compositions claimed herein through use of the term "comprising" may include any additional additive or compound, unless stated to the contrary. In contrast, the term, "consisting essentially of" if appearing herein, excludes from the scope of any succeeding recitation any other component, step or procedure, except those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical objects of the article. The phrases "in one embodiment", "according to one embodiment" and the like generally mean the particular feature, structure, or characteristic following the phrase is included in at least one embodiment of the present disclosure, and may be included in more than one embodiment of the present disclosure. Importantly, such phrases do not necessarily refer to the same aspect. If the specification states a component or feature "may", "can", "could", or "might" be included or have a characteristic, that particular component or feature is not required to be included or have the characteristic.

The term "about" as used herein can allow for a degree of variability in a value or range, for example, it may be within 10%, within 5%, or within 1% of a stated value or of a stated limit of a range.

The term "wellbore fluid" refers to a fluid that may be used to prepare a wellbore or a subterranean formation penetrated by the wellbore for the recovery of material from the formation. Thus, the wellbore fluid may serve as, for example, a drilling fluid, a workover fluid, a fracturing fluid or a sweeping fluid.

The term "subterranean formation" encompasses both areas below exposed earth or areas below earth covered by water such as sea or ocean water.

The term "wellbore" denotes a vertical, horizontal or slanted hole drilled in a subterranean formation to access deeper regions of a subterranean formation in which exploitation fluids such as oil, gas or water may be located. The wellbore may be straight, curved, or branched and includes any cased portion, or any uncased or open-hole portion of the wellbore.

The term "non-crosslinked" refers to a copolymer that has between 0-10% gel, or between 0-5% gel, or between 0-1% gel. It should not be construed that absolutely zero crosslinking is present, as some crosslinking may inevitably occur during processing, but that the crosslinking should be kept to a minimum.

The term "copolymer" refers to a polymer derived from more than one species of monomer.

Values expressed in a range format should be interpreted in a flexible manner to include not only the numerical values explicitly recited as the limits of the range, but to also include all of the individual numerical values or sub-ranges encompassed within that range as if each numerical value and sub-range is explicitly recited. For example, a range such as from 1 to 6, should be considered to have specifically disclosed sub-ranges, such as, from 1 to 3, from 2 to 4, from 3 to 6, etc., as well as individual numbers within that range, for example, 1, 2, 3, 4, 5, and 6. This applies regardless of the breadth of the range.

The term "substantially free" refers to a composition or material in which a particular compound or moiety is present in an amount that has no material effect on the composition or material. In some embodiments, "substantially free" may refer to a composition or material in which the particular compound or moiety is present in the composition or material in an amount of less than 2% by weight, or less than 1% by weight, or less than 0.5% by weight, or less than 0.1% by weight, or less than 0.05% by weight, or even less than 0.01% by weight based on the total weight of the composition or material, or that no amount of that particular compound or moiety is present in the respective composition or material.

The present disclosure is generally directed to wellbore fluids containing a water-based fluid and a latex comprising a non-crosslinked copolymer of non-carboxylated monomers. The latex of the present disclosure has been found to be highly effective in reducing fluid loss of water-based wellbore fluids at high temperatures and pressures frequently encountered during oilfield operations, such as temperatures ranging from a low of about 25° C., or 50° C., or 60° C., or 70° C., or 80° C., or 90° C., or 100° C., or 125° C. to a high of about 200° C., or 210° C., or 220° C. or higher, and pressures ranging from ambient pressure to a high of about 10,000 psi or 20,000 psi or 30,000 psi, or higher with minimal or no increase in viscosity of the wellbore fluid.

Thus, in one embodiment the wellbore fluid includes a water-based fluid including but not limited to, at least one of fresh water, sea water, brine, a mixture of water and water-soluble organic compounds and mixtures thereof. For example, the water-based fluid may be formulated with a mixture of desired salts in fresh water. Such salts may include, but are not limited to alkali metal chlorides and bromides. In various embodiments disclosed herein, the brine may include seawater, aqueous solutions wherein the salt concentration is less than that of sea water or aqueous solutions wherein the salt concentration is greater than that of sea water. Salts that may be incorporated in brine include any one or more of those present in natural seawater or any other organic or inorganic dissolved salts. Additionally, brines that may be used in the wellbore fluids disclosed herein may be natural or synthetic, with synthetic brines tending to be much simpler in constitution. In one embodiment, the density of the wellbore fluid may be controlled by increasing the salt concentration in the brine (up to saturation). Thus, in one embodiment, the density of the wellbore fluid may be between about 9 lb/gal to about 16 lb/gal. In a particular embodiment, the brine may include a halide salt of a monovalent cation of a metal, such as potassium and/or sodium. For example, the brine may include potassium halides, such as potassium chloride and/or sodium halides, such as sodium bromide or sodium chloride or both. The brine may include the salts in conventional amounts, generally ranging from about 1 weight % to about 80 weight % or from about 20 weight % to about 60 weight %, based on the total weight of the brine, although as the skilled artisan will appreciate, amounts outside of this range can be used as well.

The amount of the water-based fluid in the wellbore fluid may vary depending upon the particular water-based fluid used and the particular application in which the wellbore fluid is to be employed. In some embodiments, the amount of the water-based fluid may be at least about 50%, or at least about 60%, or at least about 70%, or at least about 80% or at least about 90% by volume of the total volume of the wellbore fluid. In other embodiments, the amount of the water-based fluid may be less than about 99%, or at less than about 95%, or at less than about 90%, or less than about 80%, or less than about 75% by volume of the total volume of the wellbore fluid. In still other embodiments, the amount of the water-based fluid may be between about 50% to about 95% by volume of the total volume of the wellbore fluid.

According to another embodiment, the wellbore fluid includes a latex comprising a non-crosslinked copolymer of non-carboxylated monomers. In one embodiment, the non-carboxylated monomer may include those compounds having a formula (1):

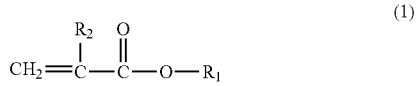

where $R_1$ is a branched or unbranched alkyl group having from 1 to 30 carbon atoms and $R_2$ is hydrogen or methyl. In one embodiment, $R_1$ is a branched or unbranched alkyl group having from 1 to 22 carbon atoms, or a branched or unbranched alkyl group having from 1 to 15 carbon atoms, or a branched or unbranched alkyl group having from 1 to 12 carbon atoms or a branched or unbranched alkyl group having from 1 to 8 carbon atoms and $R_2$ is hydrogen. Examples of compounds of the formula (1) include, but are not limited to, methyl acrylate, ethyl acrylate, butyl acrylate, hexyl acrylate, 2-ethylhexyl acrylate, decyl acrylate, lauryl acrylate, stearyl acrylate, methyl methacrylate, ethyl methacrylate, lauryl methacrylate and stearyl methacrylate. In one particular embodiment, the compound of formula (1) may be butyl acrylate or 2-ethylhexyl acrylate.

The non-carboxylated monomer may also be those compounds having the formula (2):

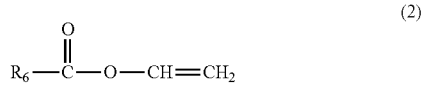

where $R_6$ is an alkyl group having from 1 to 4 carbon atoms, such as methyl. Non-limiting examples of compounds of the formula (2) include vinyl acetate, vinyl propionate and vinyl butyrate. According to one embodiment, the non-carboxylated monomers used in forming the copolymer are selected from butyl acrylate, 2-ethylhexyl acrylate and vinyl acetate. In one particular embodiment, at least one of the monomers used in forming the copolymer is 2-ethylhexyl acrylate and the other monomers are selected from butyl acrylate, vinyl acetate and a mixture thereof. According to still another embodiment, the wellbore fluid is substantially free of copolymers of either a natural polymer (i.e. a polymer produced by a living organism), styrene or butadiene.

The copolymer may be prepared using a polymerization method known in the art such as a free radical technique in a solution, a suspension, or an emulsion environment. Suitable polymerization methods are disclosed in U.S. Pat. No. 3,547,899, which is incorporated by reference herein in its entirety. The level of copolymer in the latex may be about 10 weight % to about 65 weight %, or about 20 weight % to about 55 weight % or about 40 weight % to about 50 weight %, based on the total weight of the latex. Other materials besides water may also be present in the latex in minor amounts, such as a surfactant and/or defoamer.

According to one embodiment, the latex comprising the non-crosslinked copolymer of non-carboxylated monomers according to the present disclosure may be present in the wellbore fluid in an amount of at least about 0.5 lb/bbl of wellbore fluid or at least about 1 lb/bbl of wellbore fluid, or at least about 1.5 lb/bbl of wellbore fluid, or at least about 2 lb/bbl of wellbore fluid or at least about 3 lb/bbl of wellbore fluid. In another embodiment, the latex comprising the non-crosslinked copolymer of non-carboxylated monomers according to the present disclosure may be present in the wellbore fluid in an amount of up to about 15 lb/bbl of wellbore fluid, or up to about 12 lb/bbl of wellbore fluid, or up to about 10 lb/bbl of wellbore fluid or up to about 8 lb/bbl wellbore fluid. In still another embodiment, the latex comprising the non-crosslinked copolymer of non-carboxylated monomers according to the present disclosure may be present in the wellbore fluid in an amount of between about 1 lb/bbl-12 lb/bbl of wellbore fluid, or between about 2 lb/bbl-10 lb/bbl of wellbore fluid, or between about 3 lb/bbl-8 lb/bbl of wellbore fluid, or between about 5 lb/bbl-7 lb/bbl of wellbore fluid.

Other customary oilfield chemical additives may also be included in the wellbore fluid. An oilfield chemical additive is intended to refer to any material placed within a wellbore to address various undesired effects caused by, for example, scale formation, salt formation, paraffin deposition/formation, gas hydrate formation, corrosion and asphaltene precipitation, and can include, but is not limited to, a viscosifier, an emulsifier, an acid, a base, a pH buffer, a weighting agent, a friction reducer, a biocide, an inorganic scale inhibitor, a hydrate or halite inhibitor, a corrosion inhibitor, a wax inhibitor, an asphaltene control substance, a gel breaker, a drag reducer, a salt inhibitor, a gas hydrate inhibitor, an oxygen scavenger, an $H_2S$ scavenger, a chemical scavenger, a foaming agent, a surfactant, a solvent, propping agents and a thinning agent.

Viscosifiers which may be included are known and generally include polyvinyl alcohol resin, acrylic polymer, polyacrylamide, partially hydrolyzed polyacrylamide, polyacrylate, cellulosic polymer, carboxymethyl cellulose, hydroxyethyl cellulose, polyanionic cellulose, hydroxypropyl methyl cellulose, starch, polysaccharide, hydroxypropyl starch, modified starch, polyionic starch ether, polyvinyl pyrrolidone, carboxymethylated polymer, hydroxyalkylated polymer, hydroxypropyl guar, guar gum, diutan gum, welan gum, xanthan gum, biopolymer, polymerized fatty acid, polyglycol, polyalkene glycol, polyglycerol, ester, polyanion lignin, copolymers of any of the preceding, graft modified polymers of any of the preceding, crosslinked polymers of any of the preceding, and combinations thereof. The amount of viscosifier that may be present in the wellbore fluid may be between about 1 lb/bbl-10 lb/bbl of wellbore fluid, or between about 5 lb/bbl-8 lb/bbl of wellbore fluid.

Emulsifiers may include paraffins, fatty-acids, amine-based components, polyolefin amides, soaps of fatty acids, polyolefin amide alkene amines, alkoxylated ether acids (such as an alkoxylated fatty alcohol terminated with a carboxylic acid), oleate esters, such as sorbitan monoleate, sorbitan dioleate, imidazoline derivatives or alcohol derivatives and combinations or derivatives of the above. In one or more embodiments, the emulsifier may be a dimer poly-carboxylic $C_{12}$-$C_{22}$ fatty acid, trimer poly-carboxylic $C_{12}$-$C_{22}$ fatty acid, tetramer poly-carboxylic $C_{12}$-$C_{22}$ fatty acid, mixtures of these acids.

Exemplary acids include hydrochloric acid, hydrofluoric acid, sulfamic acid, an organic carboxylic acid such as formic acid, acetic acid, and citric acid, a partially neutralized polycarboxylic acid sequestrant such as EDTA dipotassium salt or a biodegradable sequestrant alternative such as L-glutamic acid N,N-diacetic acid di-potassium salt, a readily hydrolysable acid precursor such as a formate ester, acetate ester, orthoformate ester, and particles of polyesters such as poly(lactic acid).

Exemplary pH buffers and bases include magnesium oxide, potassium hydroxide, calcium oxide, and calcium hydroxide.

Exemplary weighting agents include barite, calcium carbonate, dolomite, ilmenite, hematite, ground marble and limestone.

Exemplary inhibitors for preventing inorganic scale formation include, but are not limited to, lignin amines, inorganic and organic polyphosphates, carboxylic acid copolymers, phosphinic polycarboxylate, polyepoxysuccinic acid, polyaspartates, sodium gluconate and sodium glucoheptanate, Exemplary biocides include, but are not limited to, iodopopargyl butyl carbamate, aldehydes, formaldehyde condensates, thazines (e.g., 1,3,5-tris-(2-hydroxyethyl-1,3,5-hexahydrotriazine)), dazomet (e.g., 3,5-dimethyl-2H-1,3,5-thiadiazinane-2-thione), glutaraldehyde (e.g., 1,5 pentanedial), phenolics, carbonic acid esters, tetrakis(hydroxymethyl)phosphonium sulfate (THPS).

Exemplary $H_2S$ scavengers include, but are not limited to, triazines, aldehydes, metal oxides and chelating agents, amines, carboxamides, alkylcarboxyl-azo compounds cumine-peroxide compounds, morpholino and amino derivatives, morpholine and piperazine derivatives, amine oxides, alkanolamines, and aliphatic and aromatic polyamines.

Exemplary gas hydrate control agents include, but are not limited to, polymers of vinyl caprolactam and amine based hydrate inhibitors.

Exemplary wax (paraffin) inhibitors include, but are not limited to, ethylene/vinyl acetate copolymers, urea, fullerenes, acrylates (such as polyacrylate esters and methacrylate esters of fatty alcohols) and olefin/maleic esters.

Exemplary asphaltene control substances include, but are not limited to, fatty ester homopolymers and copolymers, such as, fatty esters of acrylic and methacrylic acid homopolymers and copolymers, esters of polymaleate, polyphosphoric acid, polycarboxylic acid, and N,N-dialkylamides of fatty acid, sorbitan monooleate, alkylaryl sulfonic acid, and alkyl phenol.

Exemplary corrosion inhibitors include, but are not limited to, fatty imidazolines, alkyl pyridines, alkyl pyridine quaternaries, fatty amine quaternaries and phosphate salts of fatty imidazolines.

Exemplary foaming agents include, but are not limited to, oxyalkylated sulfates or ethoxylated alcohol sulfates or mixtures thereof.

Exemplary microorganisms include, but are not limited to, anaerobic microorganisms, aerobic microorganisms, and combinations thereof.

Exemplary catalysts include fluid catalytic cracking catalysts, hydroprocessing catalysts, and combinations thereof.

Exemplary surfactants include an anionic surfactant, a nonionic surfactant, a zwitterionic surfactant, an amphoteric surfactant, a cationic surfactant or a mixture thereof. Anionic surfactants can include, but are not limited to, internal olefin sulfonates, alkoxylated alcohol sulfates, alkoxylated alcohol sulfonates, alkyl-aryl sulfonates, α-olefin sulfonates, alkane sulfonates, alkane sulfates, alkylphenol sulfates, alkylamide sulfates, alkylamine sulfates, alkylamide ether sulfates, alkylaryl polyether sulfonates, alkylphenol sulfonates, lignin sulfonates, petroleum sulfonates, phosphates esters, alkali metal, ammonium or amine salts of fatty acids, fatty alcohol ether sulfates, alkyl-ether carboxylates, N-acyl-N-alkyltaurates, arylalkane sulfonates, sulfosuccinate esters, alkyldiphenylethersulfonates, alkylnaphthalenesulfonates, naphthalenesulfonic acid-formaldehyde condensates, alkyl isothionates, fatty acid polypeptide condensation products, sulfonated glyceride oils, fatty acid monoethanolamide sulfates, α-sulfonated fatty acid esters, N-acyl glutamates, N-acyl glycinates, N-acyl alanates, acylated amino acids, and fluorinated anionics. Nonionic surfactants can include, but are not limited to, alkoxylated alkylphenols, alkoxylated alcohols, alkoxylated glycols, alkoxylated mercaptans, long-chain carboxylic acid esters, alkanolamine condensates, alkanolamides, tertiary acetylenic glycols, alkoxylated silicones, N-alkylpyrrolidones, ethoxylated hydrocarbons, fatty amine oxides, fatty acid glycol partial esters, fatty acid alkanolamides, and alkylpolyglucosides. Zwitterionic and amphoteric surfactants can include, but are not limited to, $C_8$-$C_{18}$ betaines, $C_8$-$C_{18}$ sulfobetaines, $C_8$-$C_{24}$ alkylamido $C_1$-$C_4$ alkylenebetaines, 3-N-alkylaminopropionic acids, N-alkyl-3-iminodipropionic acids, imidazoline carboxylates, N-alkylbetaines, amidoamines, amidobetaines, amine oxides, and sulfobetaines. Cationic surfactants can include, but are not limited to, long-chain amines and corresponding salts, acylated polyamines, quaternary ammonium salts, imidazolium salts, alkoxylated long-chain amines, quaternized long-chain amines, and amine oxides.

Exemplary solvents include ethyl alcohol, n-propyl alcohol, isopropyl alcohol, isobutyl alcohol, n-butyl alcohol, sec-butyl alcohol, n-pentyl alcohol, sec-amyl alcohol, n-hexyl alcohol, n-octyl alcohol, 2-ethylhexyl alcohol, ethylene glycol n-butyl ether, diethylene glycol n-butyl ether, triethylene glycol n-butyl ether, propylene glycol methyl ether, propylene glycol methyl ether acetate, lauryl alcohol ethoxylates, glycerin, poly(glycerin), polyalkylene alcohol ethers, polyalkylene glycols, poly(oxyalkylene)glycols and poly(oxyalkylene)glycol ethers Exemplary propping agents which can be used in the present disclosure include any known particulate for use in wellbore fluids. Non-limiting examples include minerals, ceramics such as sintered ceramic particles, sands, nut shells, gravel, mine tailings, coal ashes, rocks, smelter slag, diatomaceous earth, crushed charcoals, micas, sawdust, wood chips, resinous particles, polymeric particles, metallic particles and combinations thereof.

Exemplary thinning agents include lignosulfonates, modified lignosulfonates, polyphosphates, tannins, and low molecular weight polyacrylates.

When present, the amount of such oilfield chemical additives may range from between about 0.5 lb/bbl-40 lb/bbl of wellbore fluid, or from about1 lb/bbl-30 lb/bbl of wellbore fluid or from about 1.5 lb/bbl-20 lb/bbl of wellbore fluid.

The methods used in preparing the wellbore fluids described herein are not critical. For example, conventional methods can be used to prepare the wellbore fluids in a manner analogous to those normally used to prepare conventional wellbore fluids. In one representative procedure, a desired quantity of the water-based fluid, the latex comprising the non-crosslinked copolymer according to the present disclosure and any other remaining components are added sequentially or at the same time with continuous mixing. Formulation may take place prior to introducing the wellbore fluid into a wellbore and/or within a wellbore itself. Thus, in an embodiment, the wellbore fluid may be prepared at the wellsite. Alternatively, the wellbore fluid may be prepared offsite and transported to the well site before being placed into the wellbore.

According to another embodiment, the wellbore fluid of the present disclosure can be placed into a wellbore and used to service the wellbore in accordance with suitable procedures. For example, when the intended use of the wellbore fluid is as a drilling fluid or drilling mud, the wellbore fluid can be circulated down through a hollow drill stem and out through a drill bit attached thereto while rotating the drill stem to thereby drill the wellbore. The drilling fluid can be flowed back to the surface in a circulatory repetitive path such as to lubricate the drill bit, deposit a filter cake on the walls of the wellbore and to continuously carry drill cuttings to the surface.

In some embodiments, if sealing of a particular interval of the wellbore is needed, a solution of the wellbore fluid may be injected into such an interval, in addition to other intervals, such as in a pill. The wellbore fluids described herein may be used in conjunction with any drilling or completion operation. In particular, the wellbore fluid of the present disclosure may be injected into a work string, flow to bottom of the wellbore, and then out of the work string and into the annulus between the work string and the casing or wellbore. This treatment is typically referred to as a "pill." The pill may be pushed by injection of other wellbore fluids such as completion fluids behind the pill to a position within the wellbore which is immediately above a portion of the subterranean formation where fluid loss is suspected. Injection of wellbore fluids into the wellbore is then stopped, and fluid loss will then move the pill toward the fluid loss location. Positioning the pill in a manner such as this is often referred to as "spotting" the pill. Injection of such pills is often through coiled tubing or by a process known as "bullheading."

Thus, according to one embodiment, there is provided a method of reducing fluid loss in a wellbore comprising the step of adding to a wellbore fluid a latex comprising a non-crosslinked copolymer of non-carboxylated monomers in accordance with the present disclosure; and circulating the wellbore fluid during drilling of the wellbore.

In another embodiment, there is provided a method of reducing fluid loss in a wellbore comprising the step of monitoring drilling fluid losses during drilling of the wellbore; and if fluid losses exceed an acceptable level, injecting a latex comprising the non-crosslinked copolymer of non-carboxylated monomers in accordance with the present disclosure into the wellbore.

As noted above, upon introducing a wellbore fluid of the present disclosure into a wellbore, a filter cake may be formed which provides an effective sealing layer on the walls of the wellbore thereby preventing undesired invasion of fluid into the subterranean formation through which the wellbore is drilled. Filter cakes formed from wellbore fluids disclosed herein include copolymers of non-carboxylated monomers and may have unexpected properties. Such properties may include increased pressure blockage, reliability of blockage, and increased range of formation pore size that can be blocked. These filter cakes may provide filtration control across temperature ranges up to greater than 400° F.

Where the subterranean formation is a low permeability formation such as shales or clays, the filter cakes formed using the wellbore fluids and methods of the present disclosure prevent wellbore fluid loss and filtrate loss by effectively blocking at least some of the pores of the low permeation formation. This may allow for support of the formation by maintaining sufficient pressure differential between the wellbore fluid column and the pores of the wellbore. Further, the filter cakes formed by wellbore fluids of the present disclosure may effectively seal earthen formations. These filter cakes are stable at elevated temperatures, and may also effectively seal low permeability formations. Before taking the well into production, filter cake in the producing region may be removed, such as by using a variety of techniques known in the art. For example, filter cakes according to present disclosure may be removed using a breaker fluid comprising an acidic aqueous solution. Examples of acids that may be used include strong mineral acids, such as hydrochloric acid or sulfuric acid, and organic acids, such as citric acid, lactic acid, malic acid, acetic acid, and formic acid. The breaker fluid may have a pH below 4, or below 3 in another embodiment. In other embodiments, the filter cake may be removed using a breaker liquid comprising a natural polymer degrading enzyme, for example, a carbohydrase. Examples of such enzymes include amylases, pullulanases, and cellulases. In yet other embodiments, the filter cake may be removed using a washing liquid comprising an oxidizing agent, such as sodium hypochlorite.

According to yet another embodiment, there is generally provided a method of drilling a wellbore through a subterranean rock formation including:
 a) pumping a drilling fluid comprising water-based fluid and a latex comprising a non-crosslinked copolymer according to the present disclosure into tubing placed in the wellbore and through nozzles in a drilling bit attached to a bottom end of the tubing while rotating the bit to detach cuttings from the rock formation;
 b) transporting the cuttings up an annulus between the tubing and wellbore wall, the cuttings transport being facilitated by the flow of the drilling fluid;
 c) using an apparatus to remove at least some of the cuttings from the drilling fluid after it exits the wellbore at the surface to form a cleaned drilling fluid;
 d) pumping the cleaned drilling fluid down the tubing again thereby repeating the process until the desired interval of the subterranean rock formation has been drilled.

According to still another embodiment there is generally provided a method for completing a wellbore that penetrates through a porous and permeable subterranean formation comprising:
 a) pumping a completion fluid comprising a water-based fluid and a latex comprising a non-crosslinked copolymer according to the present disclosure into production tubing placed within the wellbore so that the formation fluid pressure and/or losses of completion fluid to the formation are controlled;
 b) performing the operations required to complete the well (such as perforating a casing, under-reaming (widening the wellbore diameter), fracturing the formation, placing gravel packs for the purpose of sand-control, installing sand screens, installing production tubing and packers);
 c) displacing the completion fluid from the production tubing; and
 d) allowing production to commence or injection to begin.

According to still another embodiment, there is generally provided a method for of working over a wellbore that penetrates through a porous and permeable subterranean formation comprising:

a) pumping a workover fluid comprising a water-based fluid and a latex comprising a non-crosslinked copolymer according to the present disclosure into production tubing placed within the wellbore so that a completed interval and production tubing is at least partly filled with the workover fluid;
b) performing the operations required to repair the well (such as removing the production tubing, milling out the packer, sealing intervals that delivered unwanted high water-cut, re-perforating, fracturing the formation, placing gravel packs and or sand screens for the purpose of sand-control, installing new production tubing and packers);
c) displacing the workover fluid from the production tubing; and
d) allowing production to commence or injection to begin.

EXAMPLES

An exemplary latex comprising a non-crosslinked copolymer according to the present disclosure ("Example 1") was added to several different wellbore fluids to determine its effects on fluid loss and rheology of the wellbore fluids. Example 1 comprised a non-crosslinked copolymer of monomers selected from 2-ethylhexyl acrylate, butyl acrylate and vinyl acetate. The amount of copolymer present in the latex was about 45 weight %.

A screening test and performance tests were conducted by adding Example 1 directly into various wellbore fluids and hot rolling for 16 hours at 350° F. before conducting high temperature/high pressure (HTHP) fluid loss on paper for 30 minutes at 350° F. and 500 psi overbalance pressure (all fluid loss values reported below have been doubled). Samples of the wellbore fluids without Example 1 were used as a comparison and tested according to the same parameters above. The after hot rolling PV's (rheology readings at 120° F.) were compared in wellbore fluids with and without Example 1 to determine any rheology increase.

The screening test was conducted in a 10.1 lb/gal NaBr based wellbore fluid at concentrations of 4 lb/bbl to 8 lb/bbl of Example 1. Fluid loss and rheology were tested according to the above methods. Table 1 below shows the components which were also present in the 10.1 lb/gal NaBr based wellbore fluid and Table 2 shows the fluid loss and rheology results.

TABLE 1

| 10.1 lb/gal NaBr based Wellbore Fluid | | |
| --- | --- | --- |
| Component | Function | Concentration (lb/bbl) |
| Water | Base | 243.40 |
| 12.5 lb/gal NaBr Brine | Density | 121.69 |
| Defoam Extreme | Defoamer | 0.35 |
| VeraVis Branched Synthetic Polymer | Viscosifier | 6.0 |
| SP-101 | Dispersant | 0.5 |
| Safe-Carb ® 2 | Bridging | 15.0 |
| Safe-Carb ® 10 | Bridging | 25.0 |
| Safe-Carb ® 20 | Bridging | 10.0 |
| Example 1 | Fluid loss control | See Table 2 |

TABLE 2

| Rheology and fluid loss (16 hours at 350° F.) | | | | | | | | | |
| --- | --- | --- | --- | --- | --- | --- | --- | --- | --- |
| | | Fluid Loss Control Agent | | | | | | | |
| | | None | | Example 1 | | Example 1 | | Example 1 | |
| | | Concentration (lb/bbl) | | | | | | | |
| | | None | | 4.0 | | 6.0 | | 8.0 | |
| | | Dynamic aging time | | | | | | | |
| Aging Temp | ° F. | Initial — | 16 hours 350 | Initial — | 16 hours 350 | Initial — | 16 hours 350 | Initial — | 16 hours 350 |
| 600 | rpm | 49 | 51 | 55 | 47 | 60 | 50 | 63 | 50 |
| 300 | rpm | 33 | 34 | 37 | 32 | 40 | 34 | 42 | 33 |
| 200 | rpm | 27 | 28 | 29 | 26 | 31 | 27 | 34 | 28 |
| 100 | rpm | 18 | 18 | 19 | 17 | 21 | 19 | 23 | 19 |
| 6 | rpm | 5 | 5 | 5 | 5 | 5 | 5 | 5 | 5 |
| 3 | rpm | 4 | 4 | 4 | 4 | 4 | 4 | 4 | 4 |
| PV | cP | 16 | 17 | 18 | 15 | 20 | 16 | 21 | 17 |
| YP | lbs/100 ft² | 17 | 17 | 19 | 17 | 20 | 18 | 21 | 16 |
| Fluid Loss, 30 minutes, Doubled | mL | — | 28 | — | 20 | — | 16 | — | 16 |
| Fluid Loss Reduction (After aging) | % | — | — | — | 29 | — | 43 | — | 43 |
| Rheology Increase (PV, after aging) | % | — | — | — | 0 | — | 0 | — | 0 |

From the results shown above in Table 2, a maximum fluid loss reduction of 43% was observed at a concentration of 6 lb/bbl of Example 1 without any additional fluid loss reduction observed at 8 lb/bbl of Example 1. No rheology increase occurred at the 4 lb/bbl, 6 lb/bbl or 8 lb/bbl concentrations of Example 1. Thus, a concentration of 6 lb/bbl of Example 1 was used in the subsequent performance tests below. In addition, the results in Table 2 show Example 1 was compatible in the NaBr based wellbore fluid when common oilfield chemical additives such as Defoam Extreme defoamer (silica based), SP-101 dispersant (sodium polyacrylate) and Safe-Carb® bridging additive (calcium carbonate) were present.

Performance tests were conducted in three other wellbore fluids containing different monovalent brines at different densities—a 9.3 lb/gal sodium chloride (NaCl) based wellbore fluid, a 9.2 lb/gal potassium chloride (KC1) based wellbore fluid and a 16.0 lb/gal sodium chloride/bromide (NaCl/NaBr) based wellbore fluid to determine Example 1's ability to reduce fluid loss therein. In addition, the wellbore fluids further included different common oilfield chemical additives to determine Example 1's compatibility with such additives. Further performance tests on these wellbore fluids included temperature limit (400° F.), long-term stability, lubricant compatibility and solids-laden formulations and brine compatibility.

The components of the 9.3 lb/gal NaCl based wellbore fluid that was tested are shown below in Table 3 and Table 4 shows the rheology and fluid loss results for this wellbore fluid with and without Example 1.

TABLE 3

9.3 lb/gal NaCl based Wellbore Fluid

| Products | Function | Concentration (lb/bbl) |
| --- | --- | --- |
| Water | Base | 267.42 |
| 10.0 lb/gal NaCl Brine | Density | 45.27 |
| Defoam Extreme | Defoamer | 0.35 |
| KLA-STOP | Shale Inhibitor | 11.6 |
| VeraVis Branched Synthetic Polymer | Viscosifier | 7.0 |
| SP-101 | Dispersant | 1.0 |
| PTS-200 | Thermal Extender | 3.0 |
| Safe-Carb ® 2 | Bridging | 15.0 |
| Safe-Carb ® 10 | Bridging | 25.0 |
| Safe-Carb ® 20 | Bridging | 10.0 |
| Example 1 | Fluid loss control | See Table 4 |

TABLE 4

Rheology and fluid loss (16 hours at 350° F.)

| Fluid Loss Control Agent Concentration (lb/bbl) | | None None | | Example 1 6.0 | |
| --- | --- | --- | --- | --- | --- |
| Dynamic aging time | | Initial | 16 hours | Initial | 16 hours |
| Aging Temp | ° F. | — | 350 | — | 350 |
| 600 | rpm | 95 | 88 | 115 | 73 |
| 300 | rpm | 66 | 62 | 80 | 50 |
| 200 | rpm | 52 | 49 | 64 | 40 |
| 100 | rpm | 35 | 35 | 44 | 28 |
| 6 | rpm | 9 | 10 | 12 | 9 |
| 3 | rpm | 7 | 8 | 9 | 7 |
| PV | cP | 29 | 26 | 35 | 23 |
| YP | lbs/100 ft$^2$ | 37 | 36 | 45 | 27 |
| Fluid Loss, 30 minutes, Doubled | mL | — | 19 | — | 12 |
| Fluid Loss Reduction (After aging) | % | — | — | — | 37 |
| Rheology Increase (PV, after aging) | % | — | — | — | 0 |

From the results shown above in Table 4, 6 lb/bbl of Example 1 reduced fluid loss in the NaCl based wellbore fluid by 37% without increasing fluid rheology. Example 1 is also shown to be compatible when amine-based oilfield chemical additives (KLA-STOP and PTS-200) are present.

The components of the KCl based wellbore fluid that was tested are shown below in Table 5. Table 6 shows the rheology and fluid loss results for this wellbore fluid with and without Example 1.

TABLE 5

9.2 lb/gal KCl based Wellbore Fluid

| Products | Function | Concentration (lb/bbl) |
| --- | --- | --- |
| Water | Base fluid | 291.91 |
| KCl Salt | Density | 10.93 |
| Defoam Extreme | Defoamer | 0.35 |
| KLA-STOP | Shale inhibitor | 11.5 |
| VeraVis Branched Synthetic Polymer | Viscosifier | 5.5 |
| SP-101 | Dispersant | 0.5 |
| PTS-200 | Thermal extender | 3.0 |
| Starglide | Lubricant | 10.7 |
| Safe-Carb ® 2 | Bridging | 2.8 |
| Safe-Carb ® 10 | Bridging | 8.0 |
| Safe-Carb ® 20 | Bridging | 18.2 |
| Safe-Carb ® 40 | Bridging | 6.0 |
| API Evaluation Clay | Drilled solids | 18.0 |
| Example 1 | Fluid loss control | See Table 6 |

TABLE 6

Rheology and fluid loss results (16 hours at 350° F.)

| Fluid Loss Control Agent Concentration (lb/bbl) | | None None | | Example 1 6.0 | |
| --- | --- | --- | --- | --- | --- |
| Dynamic aging time | | Initial | 16 hours | Initial | 16 hours |
| Aging Temp | ° F. | — | 350 | — | 350 |
| 600 | rpm | 73 | 84 | 73 | 83 |
| 300 | rpm | 50 | 58 | 49 | 57 |
| 200 | rpm | 40 | 46 | 39 | 45 |
| 100 | rpm | 27 | 35 | 27 | 31 |
| 6 | rpm | 8 | 9 | 7 | 8 |
| 3 | rpm | 6 | 7 | 5 | 6 |
| PV | cP | 23 | 26 | 24 | 26 |
| YP | lbs/100 ft$^2$ | 27 | 32 | 25 | 31 |
| Fluid Loss, 30 minutes, Doubled | mL | — | 20.5 | — | 14 |
| Fluid Loss Reduction (After aging) | % | — | — | — | 32 |
| Rheology Increase (PV, after aging) | % | — | — | — | 0 |

From the results shown above in Table 6, 6 lb/bbl of Example 1 reduced the fluid loss for the KCl based wellbore fluid by 32% without increasing fluid rheology and with no compatibility problems when the lubricant (Starglide) and API evaluation clay were present. This KCl based wellbore fluid was also hot rolled at 400° F. to verify Example 1's temperature stability. Table 7 below shows the rheology and fluid loss data after aging for 16 hours at 400° F.

TABLE 7

Rheology and fluid loss results (16 hours at 400° F.)

| Fluid Loss Control Agent Concentration (lb/bbl) | | None None | | Example 1 6.0 | |
| --- | --- | --- | --- | --- | --- |
| Dynamic aging time | | Initial | 16 hours | Initial | 16 hours |
| Aging Temp | ° F. | — | 400 | — | 400 |
| 600 | rpm | 73 | 82 | 73 | 77 |
| 300 | rpm | 50 | 56 | 49 | 52 |
| 200 | rpm | 40 | 44 | 39 | 41 |
| 100 | rpm | 27 | 32 | 27 | 28 |
| 6 | rpm | 8 | 9 | 7 | 9 |
| 3 | rpm | 6 | 7 | 5 | 7 |
| PV | cP | 23 | 26 | 24 | 25 |
| YP | lbs/100 ft$^2$ | 27 | 30 | 25 | 27 |

TABLE 7-continued

Rheology and fluid loss results (16 hours at 400° F.)

| Fluid Loss Control Agent Concentration (lb/bbl) | | None None | | Example 1 6.0 | |
|---|---|---|---|---|---|
| Dynamic aging time | | Initial | 16 hours | Initial | 16 hours |
| Aging Temp | ° F. | — | 400 | — | 400 |
| Fluid Loss, 30 minutes, Doubled | mL | — | 21 | — | 15 |
| Fluid Loss Reduction (After aging) | % | — | — | — | 29 |
| Rheology Increase (PV, after aging) | % | — | — | — | 0 |

From the results shown above in Table 7, a 29% reduction in fluid loss was observed after aging the KCl based wellbore fluid at 400° F. without an increase in rheology. The fluid loss and rheology results after aging at 400° F. are shown to be comparable to those after aging at 350° F. test (see Table 6), thus demonstrating stability up to a temperature up of at least 400° F.

Long term stability testing was also performed on the 9.2 lb/gal KCl based wellbore fluid with and without Example 1. The KCl based wellbore fluid was aged for 5 days at 350° F. and Table 8 shows the rheology and fluid loss results after 5 days at 350° F.

TABLE 8

Rheology and fluid loss (5 days at 350° F.)

| Fluid Loss Control Agent Concentration (lb/bbl) | | Example 1 6.0 | |
|---|---|---|---|
| Static aging time | | Initial | 5 days |
| Aging Temp | ° F. | — | 350 |
| 600 | rpm | 73 | 87 |
| 300 | rpm | 49 | 59 |
| 200 | rpm | 39 | 47 |
| 100 | rpm | 27 | 32 |
| 6 | rpm | 7 | 9 |
| 3 | rpm | 5 | 7 |
| PV | cP | 24 | 28 |
| YP | lbs/100 ft$^2$ | 25 | 31 |
| Fluid Loss, 30 minutes, Doubled | mL | — | 16 |

As shown above in Table 8, the fluid loss and rheology of the KCl based wellbore fluid after static aging for 5 days at 350° F. were similar to those after 16 hours at 350° F. (i.e. 16 mL after 5 days v. 14 mL after 16 hours).

The components of the NaCl/NaBr based wellbore fluid that was tested are shown below in Table 9 and Table 10 shows the rheology and fluid loss results for this wellbore fluid with and without Example 1.

TABLE 9

16.0 lb/gal NaCl/NaBr Wellbore Fluid

| Products | Function | Concentration (lb/bbl) |
|---|---|---|
| 12.5 lb/gal NaBr Brine | Density | 324.75 |
| 9.8 lb/gal NaCl Brine | Density | 63.65 |
| Defoam Extreme | Defoamer | 0.5 |
| VeraVis Branched Synthetic Polymer | Viscosifier | 6.75 |

TABLE 9-continued 16.0 lb/gal NaCl/NaBr Wellbore Fluid

| Products | Function | Concentration (lb/bbl) |
|---|---|---|
| SP-101 | Dispersant | 1.0 |
| PTS-200 | Thermal extender | 5.0 |
| Safe-Scav NA | Oxygen scavenger | 1.0 |
| Safe-Scav HS | H2S scavenger | 4.0 |
| M-I BAR UFG | Density | 264.0 |
| Example 1 | Fluid loss control | See Table 8 |

TABLE 10

Rheology and fluid loss (16 hours at 350° F.)

| Fluid Loss Control Agent Concentration (lb/bbl) | | None None | | Example 1 6.0 | |
|---|---|---|---|---|---|
| Dynamic aging time | | Initial | 16 hours | Initial | 16 hours |
| Aging Temp | ° F. | — | 350 | — | 350 |
| 600 | rpm | 137 | 141 | 132 | 118 |
| 300 | rpm | 90 | 92 | 87 | 77 |
| 200 | rpm | 71 | 72 | 69 | 59 |
| 100 | rpm | 48 | 48 | 45 | 38 |
| 6 | rpm | 12 | 12 | 10 | 9 |
| 3 | rpm | 10 | 10 | 8 | 7 |
| PV | cP | 47 | 49 | 45 | 41 |
| YP | lbs/100 ft$^2$ | 43 | 43 | 42 | 36 |
| Fluid Loss, 30 minutes, Doubled | mL | — | 19 | — | 12 |
| Fluid Loss Reduction (After aging) | % | — | — | — | 37 |
| Rheology Increase (PV, after aging) | % | — | — | — | 0 |

As shown above in Table 10, 6 lb/bbl of Example 1 reduced the fluid loss by 37% without increasing fluid rheology. Thus, the fluid loss control agent of the present disclosure is even effective in a solids-laden wellbore fluid (16.0 lb/gal system density with 264 lb/bbl of solids).

The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A wellbore fluid comprising a water-based fluid, an emulsifier comprising paraffins in an amount between 10 lb/bbl to 40 lb/bbl of the wellbore fluid, a nonionic surfactant, and a latex comprising a non-crosslinked copolymer of non-carboxylated monomers comprising a compound of formula (1):

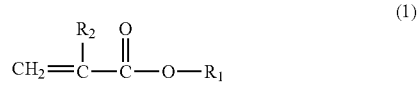

where $R_1$ is a branched or unbranched alkyl group having from 1 to 30 carbon atoms and $R_2$ is hydrogen or methyl; a compound of formula (2)

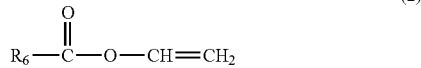
(2)

where $R_6$ is an alkyl group having 1 to 4 carbon atoms; and a mixture thereof; wherein the wellbore fluid is free of styrene or butadiene; wherein the amount of the copolymer present in the latex is about 40 weight % to about 50 weight %, based on the total weight of the latex.

2. The wellbore fluid according to claim 1, wherein the latex comprises a non-crosslinked copolymer of non-carboxylated monomers comprising the compound of formula (1), and wherein $R_1$ of formula (1) is a branched or unbranched alkyl group having from 1 to 12 carbon atoms and $R_2$ of formula (1) is hydrogen.

3. The wellbore fluid according to claim 1, wherein the latex comprises a non-crosslinked copolymer of non-carboxylated monomers comprising the compound of formula (2), and wherein $R_6$ of formula (2) is methyl; wherein formula (2) further comprises vinyl propionate and vinyl butyrate.

4. The wellbore fluid according to claim 1, wherein the latex comprises a non-crosslinked copolymer of non-carboxylated monomers comprising the compound of formula (1), and wherein the compound of formula (1) is selected from butyl acrylate, 2-ethylhexyl acrylate and a mixture thereof.

5. The wellbore fluid according to claim 1, wherein at least one monomer is 2-ethylhexyl acrylate.

6. The wellbore fluid according to claim 5, further comprising a viscosifier.

7. The wellbore fluid according to claim 1, wherein the water-based fluid comprises a brine.

8. The wellbore fluid according to claim 7, wherein the brine comprises a halide salt of a monovalent cation of a metal.

9. The wellbore fluid according to claim 8, wherein the metal is potassium or sodium.

10. The wellbore fluid according to claim 9, wherein the density of the wellbore fluid is about 9 lb/gal to about 16 lb/gal.

11. A method for conducting an oilfield operation in a wellbore comprising placing a wellbore fluid according to claim 1 into the wellbore.

12. The method according to claim 11, wherein the oilfield operation is a drilling operation, a completion stimulation operation, a sand control treatment operation, a cementing operation, a maintenance operation, an enhanced oil recovery operation or a reactivation operation.

13. A method of sealing of an interval of a wellbore comprising injecting the wellbore fluid according to claim 1 into the interval of the wellbore.

14. A wellbore fluid comprising:
i) a water-based fluid; ii) an emulsifier comprising paraffins in an amount between 10 lb/bbl to 40 lb/bbl of the wellbore fluid; iii) a nonionic surfactant, and
iv) between about 2 lb/bbl of the wellbore fluid-10 lb/bbl of the wellbore fluid of a latex comprising a non-crosslinked copolymer of monomers comprising a compound of formula (1):

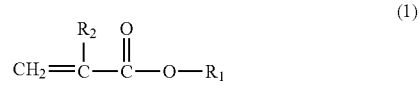
(1)

where $R_1$ is a branched or unbranched alkyl group having from 1 to 30 carbon atoms and $R_2$ is hydrogen or methyl; a compound of formula (2)

(2)

where $R_6$ is an alkyl group having 1 to 4 carbon atoms; and a mixture thereof; wherein the wellbore fluid is free of styrene or butadiene; wherein the amount of the copolymer present in the latex is about 40 weight % to about 50 weight %, based on the total weight of the latex.

15. The wellbore fluid according to claim 14, wherein the latex comprises a non-crosslinked copolymer of non-carboxylated monomers comprising the compound of formula (1), and wherein the compound of formula (1) is selected from butyl acrylate, 2-ethylhexyl acrylate and a mixture thereof, and wherein the latex comprises a non-crosslinked copolymer of non-carboxylated monomers comprising the compound of formula (2), and $R_6$ of formula (2) is methyl.

16. The wellbore fluid according to claim 15, further comprising between about 5 lb/bbl of the wellbore fluid-8 lb/bbl of the wellbore fluid of a viscosifier.

* * * * *